US010666061B2

(12) United States Patent
Keates (10) Patent No.: US 10,666,061 B2
(45) Date of Patent: *May 26, 2020

(54) ELECTRONIC POWER DEVICE WITH PROTECTION COVER (71) Applicant: INTEL CORPORATION, Santa Clara, CA (US)

(72) Inventor: Andrew Keates, Los Gatos, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/853,592

(22) Filed: Dec. 22, 2017

(65) Prior Publication Data
US 2019/0006864 A1 Jan. 3, 2019

Related U.S. Application Data (63) Continuation of application No. 15/616,400, filed on Jun. 7, 2017, now Pat. No. 10,003,206, which is a continuation of application No. 14/751,886, filed on Jun. 26, 2015, now Pat. No. 9,780,588.

(51) Int. Cl.
H01M 10/46 (2006.01)
H02J 7/00 (2006.01)
H04M 19/08 (2006.01)

(52) U.S. Cl.
CPC .............. H02J 7/00 (2013.01); H02J 7/0027 (2013.01); H02J 7/0036 (2013.01); H02J 7/0045 (2013.01); H04M 19/08 (2013.01); H02J 2207/20 (2020.01)

(58) Field of Classification Search
CPC ... H02J 7/0042; H02J 7/355; H02J 2007/0098
USPC ................. 320/107, 110, 111, 112, 114, 138
See application file for complete search history.

(56) References Cited

U.S. PATENT DOCUMENTS

| 4,794,315 A | 12/1988 | Pederson et al. |
| 5,656,914 A | 8/1997 | Nagele |
| 5,909,102 A | 6/1999 | Stone, III et al. |
| 6,124,699 A | 9/2000 | Suzuki et al. |
| 6,171,127 B1 | 1/2001 | Hebblewhite |

(Continued)

FOREIGN PATENT DOCUMENTS

WO 2010077759 7/2010

OTHER PUBLICATIONS

Final Office Action from U.S. Appl. No. 15/616,400 notified Dec. 18, 2017, 8 pgs.

(Continued)

Primary Examiner — Edward Tso
(74) Attorney, Agent, or Firm — Green, Howard & Mughal LLP (57) ABSTRACT An electronic system may include a charging device and an electronic device. The charging device may include an input port, a charge circuit, a storage, and a connector device. The charging device may receive a direct current (DC) voltage at the input port. The charge circuit may receive the DC voltage and provide a charged voltage to the storage. The electronic device may include a body, a battery, a first pad directly on the battery and a second pad directly on the battery. The battery may receive the DC charged voltage when the electronic device is coupled to the charging device.

25 Claims, 5 Drawing Sheets (56) References Cited

U.S. PATENT DOCUMENTS

| | | | |
|---|---|---|---|
| 8,237,401 B2 | 8/2012 | Sip et al. | |
| 9,780,588 B2 | 10/2017 | Keates | |
| 10,003,206 B2 * | 6/2018 | Keates | H02J 7/0052 |
| 2004/0155631 A1 | 8/2004 | Ishizu | |
| 2006/0061326 A1 | 3/2006 | Vine | |
| 2006/0097693 A1 | 5/2006 | Kim et al. | |
| 2008/0007214 A1 | 1/2008 | Cheng | |
| 2011/0037426 A1 | 2/2011 | Idzik | |
| 2011/0227527 A1 | 9/2011 | Zhu et al. | |
| 2012/0043937 A1 | 2/2012 | Williams | |
| 2012/0262117 A1 * | 10/2012 | Ferber | H02J 7/0047 320/111 |
| 2013/0163186 A1 | 6/2013 | Mizusawa | |
| 2014/0302896 A1 | 10/2014 | Xu et al. | |

OTHER PUBLICATIONS

International Search Report and Written Opinion from PCT/US2016/034086 notified Sep. 12, 2016, 14 pgs.
Non-Final Office Action for U.S. Appl. No. 15/616,400 dated Aug. 8, 2017.
Non-Final Office Action from U.S. Appl. No. 14/751,886 notified Feb. 9, 2017, 8 pgs.
Notice of Allowance from U.S. Appl. No. 14/751,886 notified Mar. 30, 2017, 5 pgs.
Notice of Allowance from U.S. Appl. No. 15/616,400 notified Feb. 22, 2018, 5 pgs.
Extended European Search Report from European Patent Application No. 16814955.7 notified Dec. 19, 2018, 12 pgs.
Non-Final Office Action from U.S. Appl. No. 15/854,514 notified Jan. 24, 2019, 8 pgs.
Notice of Allowance from U.S. Appl. No. 15/854,514 notified May 16, 2019, 5 pgs.

* cited by examiner

ELECTRONIC POWER DEVICE WITH PROTECTION COVER

CLAIM OF PRIORITY

This United States continuation patent application is related to, and claims priority to, U.S. patent application Ser. No. 15/616,400 entitled "ELECTRONIC DEVICE TO BE DIRECTLY CHARGED BY A CHARGING DEVICE," filed Jun. 7, 2017, the entire contents of which are incorporated by reference, which is a continuation of U.S. patent application Ser. No. 14/751,886 entitled "ELECTRONIC DEVICE TO BE DIRECTLY CHARGED BY A CHARGING DEVICE," filed Jun. 26, 2015, and issued as U.S. Pat. No. 9,780,588 on Oct. 3, 2017, the entire contents of which are incorporated herein by reference.

BACKGROUND

Field

Embodiments may relate to an electronic device to be powered or charged by a direct charge.

BRIEF DESCRIPTION OF THE DRAWINGS

Arrangements and embodiments may be described in detail with reference to the following drawings in which like reference numerals refer to like elements and wherein.

DETAILED DESCRIPTION

An electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc. The electronic device may also be referred to as a terminal.

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Figure 1:
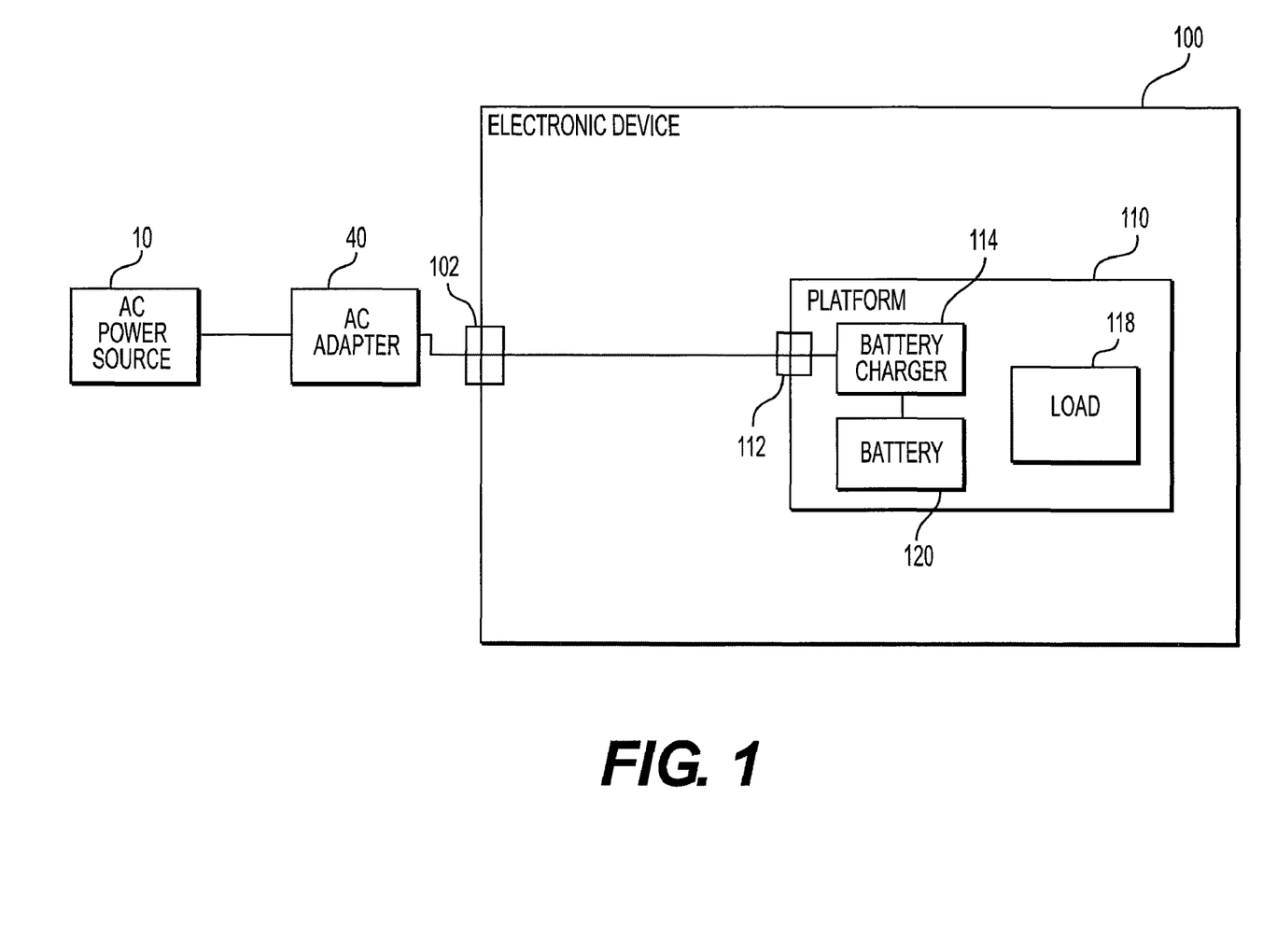
FIG. 1 shows an electronic device to be charged by an alternate current (AC) adapter according to an example arrangement.

FIG. 1 shows an electronic device 100 to be charged (or powered) by an alternate current (AC) according to an example arrangement. Other arrangements and configurations may also be provided.

FIG. 1 shows an alternate current (AC) power source 10 to provide power to an AC adapter 40. The AC adapter 40 is to provide power to an electronic device 100 (or electronic apparatus). FIG. 1 shows the AC power source 10 directly coupled to the AC adaptor 40. The AC adaptor 40 may be directly coupled to the electronic device 100.

The AC power source 10 may provide AC power to the AC adapter 40, which may provide direct current (DC) power for the electronic device 100. The received DC power may be used to power components of the electronic device 100. The received power may also be stored in a battery 120 provided in (or at) a battery port of the electronic device 100. The battery 120 may be provided within a body or housing.

The electronic device 100 may include an input port 102 and a platform 110 that includes an input port 112, a battery charger 114, a battery port to receive the battery 120 (or other charge storage device) and a load 118.

The load 118 may be any device or component on the electronic device 100 (or coupled to the electronic device 100) that operates based on a received voltage. For example, the load 118 may be a display device, a memory, a processor, a controller, an input/output device, etc. The load 118 may be coupled to the battery 120. The load 118 may also be coupled to the battery charger 114.

FIG. 1 shows the AC adapter 40 as being external (and separate) to the electronic device 100. However, the AC adapter 40 may also be internal to the electronic device 100.

The AC power source 10 may provide an AC voltage (or AC power) to the AC adapter 40. The AC adapter 40 may convert the received AC voltage to a direct current (DC) voltage. The AC adapter 40 may also be considered an AC/DC adapter or an AC/DC converter.

If the AC adapter 40 is external to the electronic device 100, then the AC adapter 40 may receive an AC voltage from the AC power source 10 and provide a DC voltage to the input port 102 (and to the battery charger 114).

The DC voltage may be provided to the battery charger 114. The battery charger 114 may provide the DC voltage to the battery 120 (provided at the battery port). The DC voltage may also, or alternatively, be provided to the load 118 (directly or indirectly via the battery charger 114) so as to operate the electronic device 100. For example, the DC voltage may be used to power a display device (or other component) on the electronic device 100. A voltage regulator may also be provided on the platform 110 (of the electronic device 100) to stabilize the voltage prior to being provided to the load.

The AC adapter 40 may be designed to receive AC power from the AC power source 10 (i.e., an AC outlet) at a specific frequency (such as a low frequency of 50 Hertz (Hz)) and to have a voltage that may vary based on a country where the AC adapter 40 is used, for example.

The AC adapter 40 may store a significant amount of energy (or power) in order to filter out a sinusoidal nature of the AC voltage (or power) inputted from the AC power source 10. In at least one disadvantageous arrangement, the AC adapter 40 may include a bulk capacitor, which may be a large component of the AC adapter 40. The bulk capacitor may be specifically designed to smooth a low-frequency oscillation due to AC line frequency (such as 50 Hz or 60 Hz).

The battery charger 114 may be considered a charging circuit (or charge circuit). The battery charger 114 may provide an output voltage to the battery 120. The battery 120 may be charged by the voltage received from the battery charger 114. The battery charger 114 may be an integrated circuit on a motherboard. The battery charger may be a step-down voltage converter that translates the voltage provided at the input port, and may be designed to provide the voltage and current necessary to charge the battery 120.

The electronic device 100 may need to be charged in order to properly operate. A user may desire to charge the electronic device 100 in a rapid manner. However, this may require a large amount of current to be provided. For example, a user may desire to charge the electronic device 100 within a 5 minute time frame by using the AC adapter 40. In order to provide such a fast charging of the battery, the charging circuit on the electronic device 100 may have to be able to handle the power (and current) necessary to fully charge the battery in a short period of time.

As one example, if the battery 120 is to be charged in a fast manner (i.e., using a high current), then the battery charger 114 (or charging circuit) may require high power field effect transistors (FETs), large circuit board tracks and a thermal solution that is capable of dealing with a high power and a high current associated with a fast charge. For example, the charging of a 1 amp/hour (Ah) battery in one minute may require a current of greater than 60 amps. As another example, in order to charge a battery in a one minute time frame, a mobile terminal (i.e., one example of an electronic device) may require more than 120 amps to be delivered to the battery 112.

Figure 2:
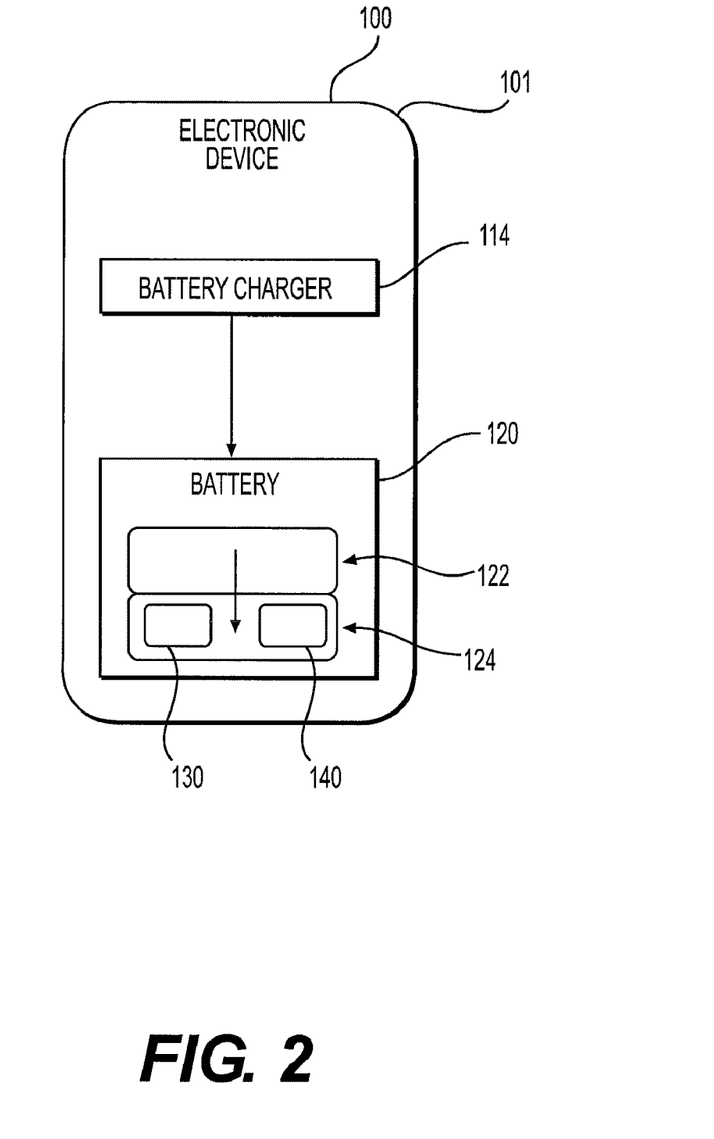
FIG. 2 shows an electronic device to be directly charged according to an example embodiment.

FIG. 2 shows an electronic device to be directly charged according to an example embodiment. Other embodiments and configurations may also be provided.

FIG. 2 shows the electronic device 100 includes a body 101 having components provided therein. The body 101 may include the battery charger 114 (or charging circuit) and the battery 120. The electronic device 100 may include a protection mechanism (or protection device). The protection mechanism may prevent a user from gaining access to terminals or pads of the battery inside the device 100. The protection mechanism may include a surface 122 (or cover) that moves relative to a surface 124 on the battery 120.

FIG. 2 shows an example embodiment in which charging pads are on a flat surface 124 of a battery and sliding surface 128 that covers the charging pads when the electronic device 100 is in use, and slides upwards to expose the charging pads for purposes of battery charging. FIG. 2 shows the surface 122 that has been moved upward to expose pads on the surface 124. The surface 122 may move based on contact with an external object.

FIG. 2 also shows the battery 120, a first pad 130 (or first charging pad) and a second pad 140 (or a second charging pad). The first pad 130 may be a direct charge pad that is directly provided on the battery 120 (such as at the surface 124). The second pad 140 may be a direct charge pad that is directly provided on the battery 120 (such as at the surface 124). Alternatively, connection points, tabs or other means may be connected to the battery terminals with high-current conductors, such as metal strips.

The first and second pads 130, 140 may be metallic pads (or metallic surfaces) that are in direct contact with the battery 120. As such, there are no wires (or other connecting device) between the pads 130, 140 and the battery 120. The first pad 130 may be a metallic surface on the battery, and the second pad 140 may be a metallic surface on the battery.

The first and second pads 130, 140 are direct charge pads that expose raw terminals of the battery 120. In one example, the first pad 130 may directly contact an anode of the battery 120, and the second pad 140 may directly contact a cathode of the battery 120. In another example, the first pad 130 may directly contact a cathode of the battery 120, and the second pad 140 may directly contact an anode of the battery 120.

The first and second pads 130, 140 directly contact an output connection terminal (or connection device) of a charging device and receive power (or voltage) from the charging device. The battery 120 may thereby directly receive a DC voltage (or power) without using the battery charger 114 within the electronic device 100. In other words, the battery 120 may directly receive a DC voltage (via the pads 130, 140) from an external power source, and without using the battery charger 114. Accordingly, the battery of the electronic device is to be directly charged using the first and second pads 130, 140.

The protection mechanism or protection device may include the sliding surface 122 to cover the first pad 130 and the second pad 140. The sliding surface 122 may move based on contact with an external object, such as a connector device.

Figure 3:
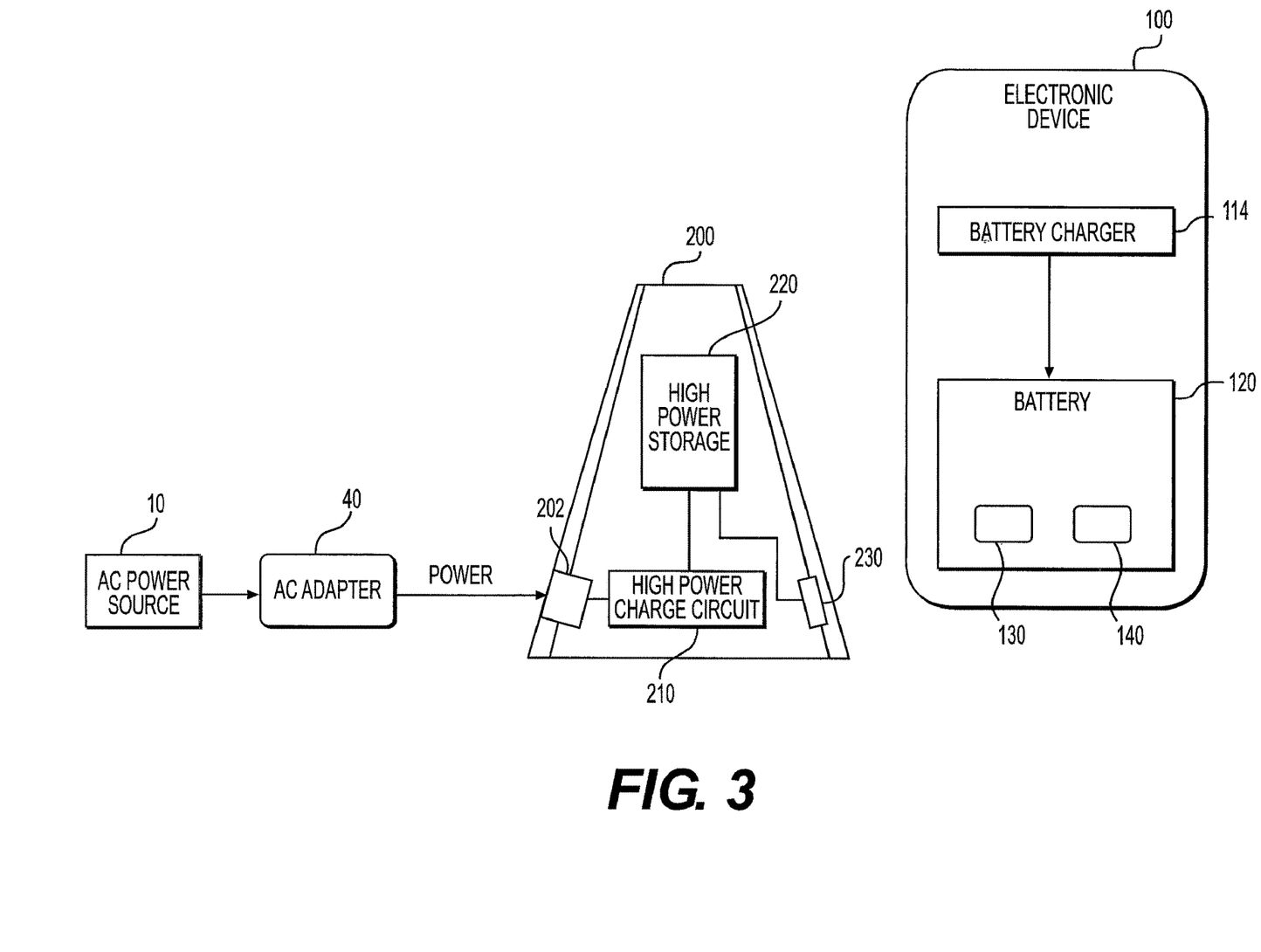
FIG. 3 shows an electronic charging system according to an example embodiment.

FIG. 3 shows an electronic charging system (or electronic system) according to an example embodiment. Other embodiments and configurations may also be provided.

FIG. 3 shows the AC power source 10, the AC adapter 40, a charging station 200 (or charging device) and the electronic device 100. The AC power source 10 may provide AC power (i.e., AC voltage) to the AC adapter 40. The AC adapter 40 may be coupled to the charging station 200 by a wire connection, for example. The AC adapter 40 may couple to an input port 202 of the charging station 200.

FIG. 3 shows the electronic device 100 being physically separated from the charging station 200. In order to perform charging of the battery 120, the electronic device 100 may need to be physically coupled (or docked) to the charging station 200. The electronic device 100 may receive a DC voltage (or DC charged voltage) when the electronic device is coupled (or docked) to the charging station (or charging device).

The charging station 200 may include an input port 202, a high power charge circuit 210, a high power storage 220 and an output connector device 230 (or connector device).

The AC adapter 40 may provide a DC voltage to the input port 202 of the charging station 200.

The DC voltage may be provided to the high power charge circuit 210.

The charge circuit 210 may be considered a high power charge circuit. The charge circuit 210 may be considered a battery charger. The charge circuit 210 may function to accumulate energy to the high power storage 220. This may be analogous to charging an automatic defibrillator, which, when charged, may be capable of delivering a large packet of energy in a short period.

The charge circuit 210 may provide charged DC voltage to the storage 220 (within the charging station 200) based on the received DC voltage. The storage 220 may be considered a high power storage. The storage 220 may be capable of dispensing an accumulated charge in a short period (measured in minutes or seconds).

The charging station 200 may avoid needing large amounts of power by accumulating energy over time. The accumulated energy may be temporarily stored in the storage 220 (of the charging station 200). The stored energy (or stored DC voltage) may be ready to be quickly provided into the electronic device 100, when the electronic device 100 is coupled to the charging station 200.

A very high power charge circuit may be provided between the high power storage 220 and the connector device 230 in order to provide more voltage from the storage 220 to the battery 120.

The storage 220 may store a large amount of energy and dispense it at a high power. As such, the storage 220 may be a large capacitor, a lithium-titanate battery, etc. The storage 220 may be able to store a large amount of energy over time. Such amounts of power may be sufficient to charge one or more electronic devices in a very short amount of time. The amount of accumulated energy in the storage 220 may be sufficient to charge one or more multiple devices.

When the electronic device 100 is physically connected to the charging station 200 (via the connector device 230), then power (i.e., current) may be directly provided to the battery 120 (of the electronic device 100). The power may be directly provided to the battery 120 by use of the pads 130, 140 (or direct charge pads). This may avoid using a charging circuit (such as the battery charger 114) on the electronic device 100. Thus, larger amounts of power may be provided to the battery 120 in a faster manner, removing the need for high powered charge circuits in the electronic device 100 and high power charging wires and ports.

The battery 120 may receive the DC voltage from the storage 220 when the electronic device 100 is coupled to the connector device 230.

As one example, the storage 220 may be a lithium-titanate battery cell that may be fully charged in approximately 5 minutes. The stored energy (or voltage) may then be dispensed to the battery 120 (of the electronic device 100) in a similar amount of time. Alternatively, a modest power AC adapter may charge the storage 220 in a much longer time (such as an hour), yet still discharge the energy necessary to charge the device in minutes.

As one example, the electronic device 100 (such as a mobile terminal) may have a lithium-titanate battery cell that measures 5.5 mm×42 mm×60 mm and has a storage capacity of 2 Ah (amp hours). In contrast, the storage 220 (of the charging station 200) may have 2 lithium-titanate battery cells, that each measure 15 mm×42 mm×60 mm and have a total storage capacity of 4 Ah (amp hours).

The AC adapter 40 may be capable of providing 90 Watts (W). The AC adapter 40 may charge the charging station 200 in approximately 20 minutes, for example. Due to the storage 220 of the charging station (as compared to the electronic device 100), the charging station 200 may have two (2) times the energy capacity of the electronic device 100. Accordingly, the charging station 200 may not need to be fully charged all the time in order to completely charge the electronic device 100, when the electronic device 100 is physically connected to the charging station 200 via the connector device 230.

The electronic device 100 may physically connect to the charging station 200 (or charging device). The electronic device 100 may be docked at the charging station 200 in order to receive power from the storage 220 of the charging station 200. When docked, the protection mechanism may expose the first and second pads 130, 140 to corresponding matching pads on the charging station 200.

The electronic device 100 may be considered as being physically connected to the charging station 200 when the pads 130, 140 (of the battery 120) are physically touching the connector device 230 of the charging station 200. In at least one embodiment, the connector device 230 may include a first connector to physically contact the first pad 130 and a second connector to physically contact the second pad 140.

When the electronic device 100 is docked (or connected to) at the charging station 200 (or charging device), then the battery 120 (of the electronic device 100) may be charged by the storage 220 (of the charging station) in less than 2 minutes, for example, if the electronic 100 device can handle the required current. A very high power charge circuit may be provided between the high power storage and the output connector device 230.

Figure 4:
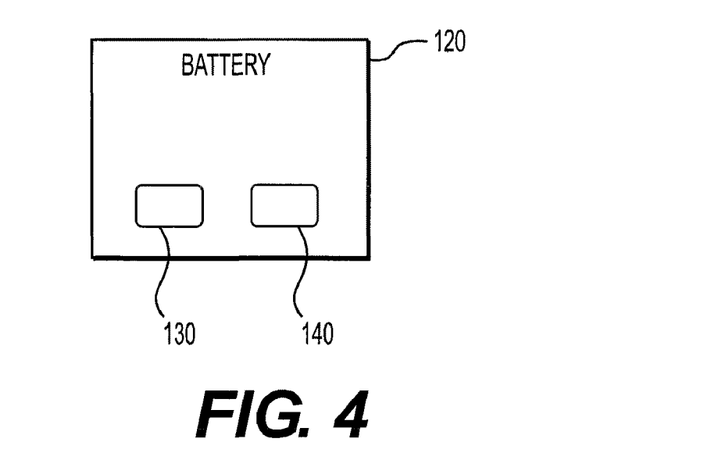
FIG. 4 shows a battery and two charging pads according to an example embodiment.

FIG. 4 shows a battery and two charge pads according to an example embodiment. Other embodiments and configurations may also be provided.

The battery 120 may be provided at a battery port within the body 101 (or housing) of the electronic device 100. The battery 120 may include an anode and a cathode. FIG. 4 shows the first pad 130 and the second pad 140 directly on the battery 120. The first and second pads 130, 140 may be provided on a surface of the battery 120. The pads 130, 140 may be exposed based on movement of the surface 122. The first pad 130 may correspond to the anode of the battery 120 by directly contacting the anode, and the second pad 140 may correspond to the cathode of the battery by directly contacting the cathode. Alternatively, the first pad 130 may correspond to the cathode of the battery 120 by directly contacting the cathode, and the second pad 140 may correspond to the anode of the battery 120 by directly contacting the anode.

The first pad 130 may be a metallic surface on the battery 120, and the second pad 140 may be a metallic surface on the battery 120. The pads 130, 140 may be made of one of nickel-plated steel, copper and gold-coated in order to achieve good electrical conductivity.

The pads 130, 140 may be provided at one end of the battery 120 so that the pads 130, 140 may physically contact the connector device 230 of the charging station 200 (or charging device).

The pads 130, 140, or other forms of high current connector, may be provided directly on the battery 120 in order to avoid any wiring and/or circuitry. This may help to avoid use of the charging circuitry 114. Alternatively, the pads 130, 140 may be connected to the battery terminals with high current conductors such as metal strips.

Figure 5A:
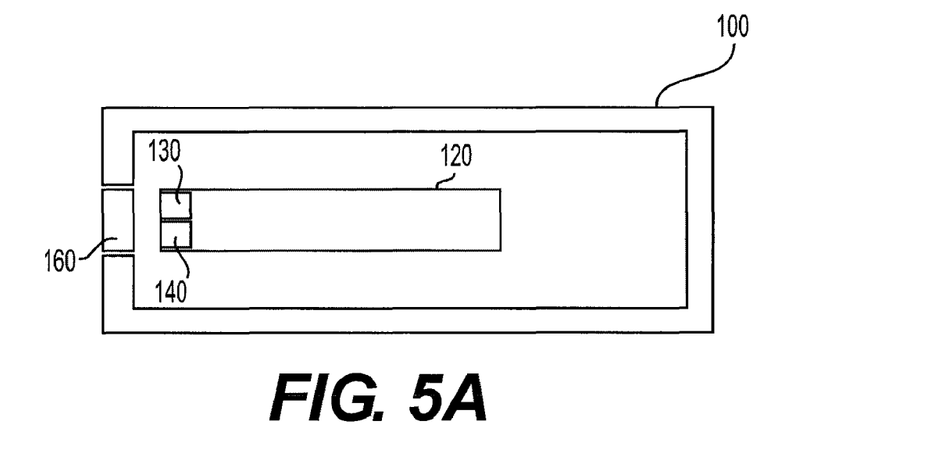
FIGS. 5A-5B show an electronic device according to an example embodiment.
Figure 5B:
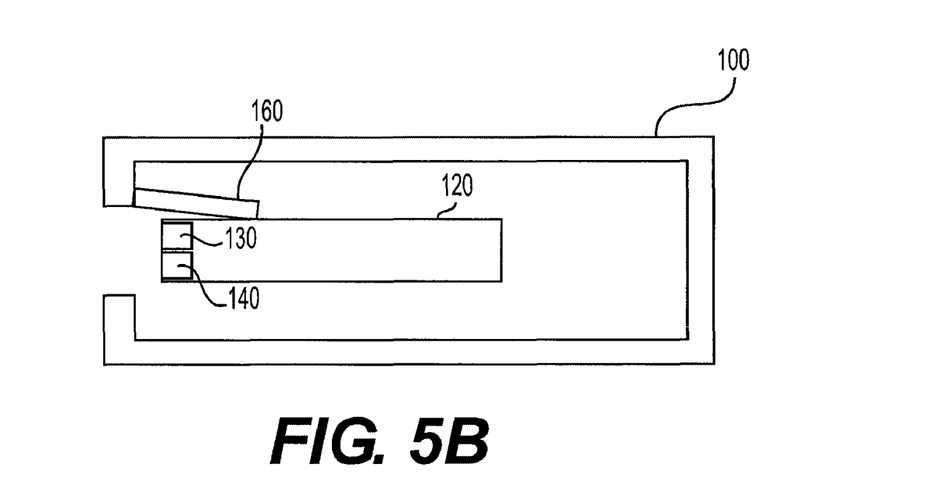

FIGS. 5A-5B show an electronic device according to an example embodiment. Other embodiments and configurations may also be provided.

FIG. 5A is a side view of the electronic device 100 and shows the battery 120 provided within a body (or housing). FIG. 5A shows the first pad 130 and the second pad 140 at the end of the battery 120.

The electronic device 100 may include a latch (or battery latch) that opens and closes in order to provide access to the first and second pads 130, 140. FIG. 5A shows a latch 160 of the electronic device in a closed position, and FIG. 5B shows the latch 160 in an opened position. The latch 160 may be opened based on contact with an external apparatus or device, such as the connector device 230 (of the charging station). The latch 160 opens and closes in order to access the battery 120 and/or the pads 130/140 (of the battery 120). The first and second pads 130, 140 may be exposed when the latch 160 is open.

The latch 160 may normally be in a closed position in order to prevent debris or water from entering into the body 110 of the electronic device 100. The latch 160 may be in an opened position when the latch 160 is pushed (or touched) by an outside object, such as the connector device 230. For example, the latch 160 may open (as shown in FIG. 5B) when the electronic device 100 becomes coupled to the charging station 200. When the latch 160 is opened, then an outside object may physically contact the pads 130, 140 of the battery 120. More specifically, when the latch 160 is opened, then an outside object may physically contact the pads 130, 140 at the one end of the battery 120.

Figure 6:
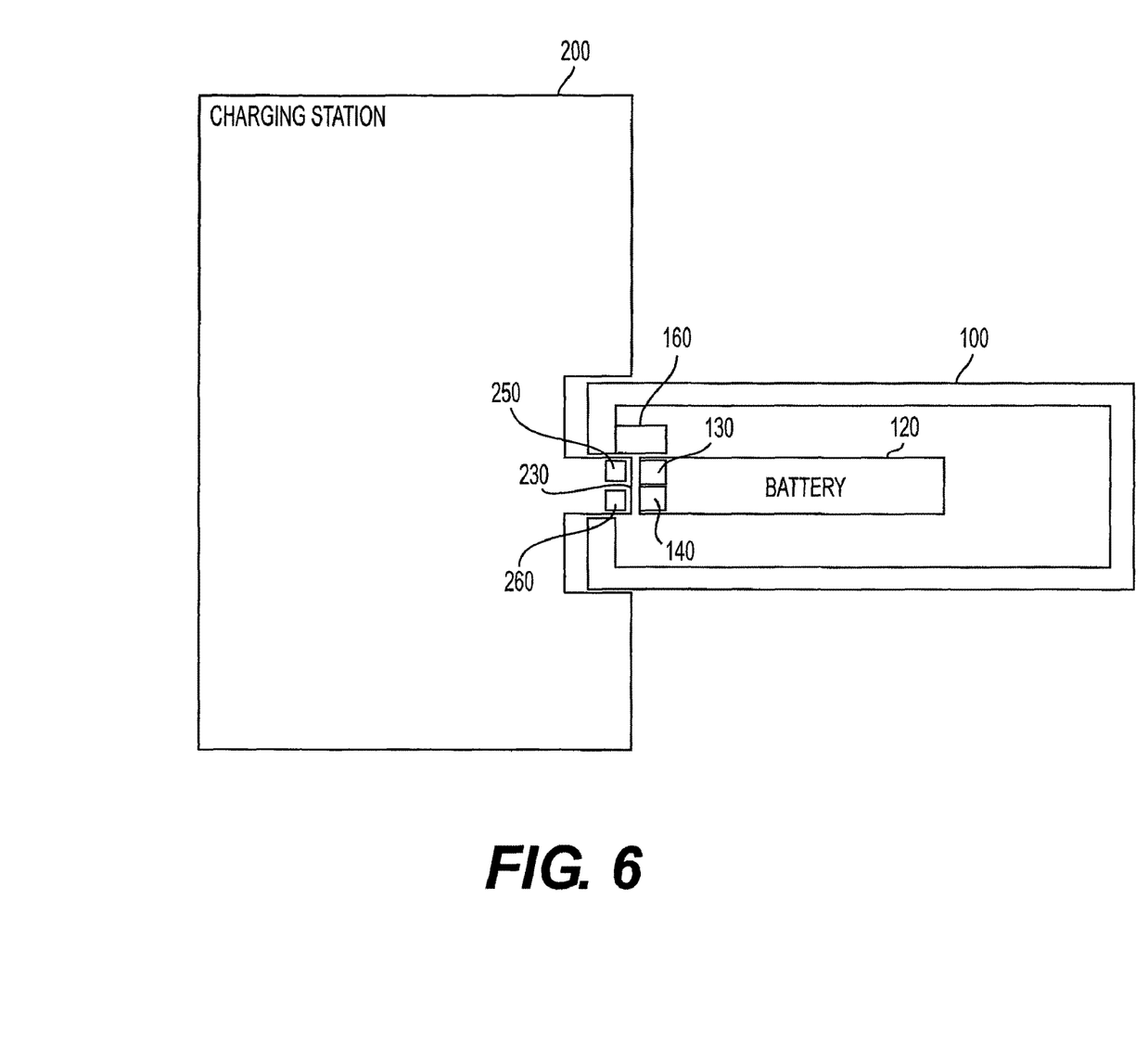
FIG. 6 shows an electronic device coupled to a charging station (or charging device) according to an example embodiment.

FIG. 6 shows an electronic device coupled to a charging station (or charging device) according to an example embodiment. Other embodiments and configuration may also be provided.

FIG. 6 shows the charging station 200 that includes the connector device 230, which includes a first terminal 250 and a second terminal 260. The first terminal 250 may physically (or directly) contact the first pad 130 and the second terminal 260 may physically (or directly) contact the second pad 140. The connector device 230 may physically push the latch 160 (of the electronic device 100) into an opened position as the electronic device 100 is being docked at the charging station 200 (or charging device).

Once the electronic device 100 is physically connected to the charging station 200 (by the connector device 230 physically contacting the pads 130, 140 of the battery 120), power stored in the storage 220 may be directly provided to the battery 120. For example, the first terminal 250 may directly contact the first pad 130, and the second terminal 260 may directly contact the second pad 140. The battery may receive DC voltage from the storage 220 of the charging device when the electronic device is coupled to the connector device 230 of the charging station.

The following examples pertain to further embodiments.

Example 1 is an electronic system comprising: a charging device including an input port, a charge circuit, a storage, and a connector device, the input port to receive a direct current (DC) voltage, the charge circuit to receive the DC voltage and to provide the DC voltage to the storage; and an electronic device that includes a body, a battery, a first pad directly on the battery and a second pad directly on the battery, and the battery to receive the DC voltage from the storage of the charging device when the electronic device is physically coupled to the connector device of the charging device.

In Example 2, the subject matter of Example 1 can optionally include the connector device includes a first terminal and a second terminal.

In Example 3, the subject matter of Example 1 and Example 2 can optionally include the first pad to physically contact the first terminal, and the second pad to physically contact the second terminal.

In Example 4, the subject matter of Example 1 and Example 3 can optionally include the first pad directly contacts an anode of the battery, and the second pad directly contacts a cathode of the battery.

In Example 5, the subject matter of Example 1 and Example 3 can optionally include the first pad directly contacts a cathode of the battery, and the second pad directly contacts an anode of the battery.

In Example 6, the subject matter of Example 1 and Examples 4-5 can optionally include the first pad is a metallic surface on the battery, and the second pad is a metallic surface on the battery.

In Example 7, the subject matter of Example 1 and Examples 4-5 can optionally include the first pad is one of nickel-plated steel, copper and gold-coated, and the second pad is one of nickel-plated steel, copper and gold-coated.

In Example 8, the subject matter of Example 1 and Examples 4-5 can optionally include the electronic device includes a latch at the body.

In Example 9, the subject matter of Example 1 and Example 8 can optionally include the latch to open based on contact with the connector device of the charging device, and the first and second pads to be exposed when the latch is open.

In Example 10, the subject matter of Examples 1-5 can optionally include the electronic device includes a protection device having a sliding surface to cover the first pad and the second pad.

In Example 11, the subject matter of Examples 1-5 can optionally include the storage of the charging device is a battery.

In Example 12, the subject matter of Examples 1-5 can optionally include the storage of the charging device is a capacitor.

In Example 13, the subject matter of Examples 1-5 can optionally include an alternate current (AC) adapter to receive AC voltage from a first power source and to provide the DC voltage to the charging device.

In Example 14, the subject matter of Examples 1 and Example 13 can optionally include the electronic device further includes a battery charger to receive power from a second power source, and the battery charger to provide power to the battery.

In Example 15, the subject matter of Example 1 and Example 14 can optionally include the battery is to be charged by the charging device without using the battery charger in the electronic device.

Example 16 is an electronic device comprising: a body; a battery to be provided in the body; a first pad to directly contact the battery; and a second pad to directly contact the battery, and the first and second pads to directly receive direct current (DC) voltage from an external charging device when the electronic device is physically coupled to the external charging device.

In Example 17, the subject matter of Example 16 can optionally include the first pad directly contacts an anode of the battery, and the second pad directly contacts a cathode of the battery.

In Example 18, the subject matter of Example 16 can optionally include the first pad directly contacts a cathode of the battery, and the second pad directly contacts an anode of the battery.

In Example 19, the subject matter of Examples 16-18 can optionally include the first pad is a metallic surface on the battery, and the second pad is a metallic surface on the battery.

In Example 20, the subject matter of Examples 16-18 can optionally include the first pad is one of nickel-plated steel, copper and gold-coated, and the second pad is one of nickel-plated steel, copper and gold-coated.

In Example 21, the subject matter of Example 16 can optionally include wherein the electronic device includes a latch at the body.

In Example 22, the subject matter of Example 16 and Example 21 can optionally include the latch to open based on contact with a connector device of the charging device, and the first and second pads to be exposed when the latch is open.

In Example 23, the subject matter of Example 16 can optionally include 16, wherein the electronic device includes a protection device having a sliding surface to cover the first pad and the second pad.

In Example 24, the subject matter of Example 16 can optionally include a battery charger to receive power from another power source, and the battery charger to provide power to the battery based on the power received from the another power source.

In Example 25, the subject matter of Example 16 and Example 24 can optionally include the battery is to be charged by the external charging device without using the battery charger in the electronic device.

Example 26 is a method of charging an electronic device, comprising: receiving direct current (DC) voltage at a charging device; charging the received DC voltage; storing the charged DC voltage at a storage of the charging device based on the received DC voltage; physically connecting the electronic device to the charging device; and in response to physically connecting the electronic device to the charging device, providing DC voltage from the storage to a first pad and a second pad of the electronic device, the first pad directly contacts a battery of the electronic device, and the second pad directly contacts the battery of the electronic device.

In Example 27, the subject matter of Example 26 can optionally include the charging device includes a connector device having a first terminal and a second terminal.

In Example 28, the subject matter of Example 26 and Example 27 can optionally include physically connecting the electronic device to the charging device includes: directly contacting the first pad on the battery to the first terminal of the charging device, and directly contacting the second pad on the battery to the second terminal of the charging device.

In Example 29, the subject matter of Example 26 and Example 27 can optionally include the first pad directly contacts an anode of the battery, and the second pad directly contacts a cathode of the battery.

In Example 30, the subject matter of Example 26 and Example 27 can optionally include the first pad directly contacts a cathode of the battery, and the second pad directly contacts an anode of the battery.

In Example 31, the subject matter of Example 26 and Examples 29-30 can optionally include the first pad is a metallic surface on the battery, and the second pad is a metallic surface on the battery.

In Example 32, the subject matter of Example 26 can optionally include physically connecting the electronic device includes opening a latch of the electronic device based on contact with the connector device.

In Example 33, the subject matter of Example 26 can optionally include storing the charged DC voltage at the storage includes storing the charged DC voltage at a battery.

In Example 34, the subject matter of Example 26 can optionally include storing the charged DC voltage at the storage includes storing the charged DC voltage at a capacitor.

In Example 35, the subject matter of Example 26 can optionally include receiving the DC voltage includes receiving alternate current (AC) voltage from a first power source and providing the DC voltage to the charging device.

In Example 36, the subject matter of Example 26 and Example 35 can optionally include charging the battery of the electronic device using a second power source.

In Example 37, the subject matter of Example 26 and Example 36 can optionally include the battery is to be charged by the charging device without using a battery charger in the electronic device.

Example 38 is a charging system comprising: first means for receiving direct current (DC) voltage; second means for storing the DC voltage in a storage based on the received DC voltage; third means for physically connecting a connector device to a first pad and a second pad directly on a battery of an electronic device; and fourth means for providing the stored DC voltage to the first and second pads on the battery when the electronic device is coupled to the charging device.

In Example 39, the subject matter of Example 38 can optionally include the third means includes a first terminal and a second terminal.

In Example 40, the subject matter of Example 38 and Example 39 can optionally include the first pad on the battery to physically contact the first terminal, and the second pad on the battery to physically contact the second terminal.

In Example 41, the subject matter of Example 38 can optionally include the first pad directly contacts an anode of the battery, and the second pad directly contacts a cathode of the battery.

In Example 42, the subject matter of Example 38 can optionally include 38, wherein the first pad directly contacts a cathode of the battery, and the second pad directly contacts an anode of the battery.

In Example 43, the subject matter of Example 38 and Examples 41-42 can optionally include the first pad is a metallic surface on the battery, and the second pad is a metallic surface on the battery.

In Example 44, the subject matter of Example 38 and Examples 41-42 can optionally include the first pad is one of nickel-plated steel, copper and gold-coated, and the second pad is one of nickel-plated steel, copper and gold-coated.

In Example 45, the subject matter of Example 38 can optionally include the electronic device includes a latch.

In Example 46, the subject matter of Example 38 and Example 45 can optionally include the latch to open based on contact with the connector device, and the first and second pads to be exposed when the latch is open.

In Example 47, the subject matter of Example 38 can optionally include the electronic device includes a protection device having a sliding surface to cover the first pad and the second pad.

In Example 48, the subject matter of Example 38 can optionally include the second means is a battery.

In Example 49, the subject matter of Example 38 can optionally include the second means is a capacitor.

In Example 50, the subject matter of Example 38 can optionally include the first means includes an alternate current (AC) adapter to receive AC voltage from a first power source and to provide the DC voltage.

In Example 51, the subject matter of Example 38 and Example 50 can optionally include the electronic device includes a battery charger to receive power from a second power source, and the battery charger to provide power to the battery.

In Example 52, the subject matter of Example 38 and Example 51 can optionally include the battery is to be charged without using the battery charger in the electronic device.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
   first and second battery pads to be in direct contact with first and second supply terminals of a docking station; and
   a protection cover to cover at least in part the first and second battery pads,
   wherein the contact between the first pad and the first terminal, and the contact between the second pad and the second terminal are to be behind the protective cover, and wherein the protection cover comprises a sliding surface to cover at least in part the first pad and the second pad.

2. The apparatus of claim 1, further comprising:
   an arrangement to dock the apparatus on the docking station, wherein the apparatus is to receive Direct Current (DC) power from the docking station.

3. The apparatus of claim 1, wherein the protection cover is to prevent at least in part exposure of the first pad and the second pad to a user.

4. The apparatus of claim 1, wherein the protection cover is to prevent at least in part visibility of the first pad and the second pad to a user.

5. The apparatus of claim 1, wherein the protection cover comprises a latch that is to open based on contact with the docking station, and the first and second pads to be exposed when the latch is open.

6. The apparatus of claim 1, wherein the docking station is to receive input DC power, and to charge the battery using the input DC power.

7. The apparatus of claim 1, wherein the apparatus lacks an internal battery charger.

8. The apparatus of claim 1, wherein the first pad is to contact an anode of the battery, and the second pad is to contact a cathode of the battery.

9. A system comprising:
   a memory to store instructions;
   a processor coupled to the memory;
   a battery to provide power to operate the processor;
   a first pad and a second pad of the battery;
   a guard structure to at least in part prevent exposure of the first pad and the second pad; and
   an arrangement to dock the system on a charging station,
   wherein the first pad and the second pad of the system are to be in direct physical contact with the first terminal and the second terminal, respectively, of the charging station, when the arrangement is to dock the system on the charging station, and
   wherein the contact between the first pad and the first terminal, and the contact between the second pad and the second terminal are to be underneath the guard structure.

10. The system of claim 9, wherein the guard structure is to cover at least in part the first pad and the second pad.

11. The system of claim 9, wherein the guard structure is to prevent at least in part visibility of the first pad and the second pad to a user.

12. The system of claim 9, wherein the guard structure comprises a latch that is to open based on contact with the charging device, and the first and second pads to be exposed when the latch is open.

13. The system of claim 9, wherein the guard structure comprises a sliding surface to cover at least in part the first pad and the second pad.

14. An apparatus comprising:
   a first terminal to be coupled to a battery within the apparatus;
   a second terminal to be coupled to the battery;
   a guard structure to prevent at least in part exposure of the first terminal and the second terminal, and to cover at least in part the first terminal and the second terminal,
   wherein the battery is to be charged by a device comprising a third terminal and a fourth terminal, and
   wherein while the battery is to be charged by the device, the third terminal is to slide under the guard structure to make direct physical contact with the first terminal, and the fourth terminal is to slide under the guard structure to make direct physical contact with the second terminal.

15. The apparatus of claim 14, wherein the cover is to prevent at least in part visibility of the first terminal and the second terminal to a user.

16. The apparatus of claim 14, wherein the guard structure comprises a latch that is to open based on contact with the device, and the first and second terminals to be exposed when the latch is open.

17. The apparatus of claim 14, wherein the apparatus is to receive Direct Current (DC) power from the device via the first and second terminals.

18. An apparatus comprising:
   first and second battery pads to be in direct contact with first and second supply terminals of a docking station; and
   a protection cover to cover at least in part the first and second battery pads,
   wherein the contact between the first pad and the first terminal, and the contact between the second pad and the second terminal are to be behind the protective cover, wherein the protection cover comprises a latch that is to open based on contact with the docking station, and the first and second pads to be exposed when the latch is open.

19. The apparatus of claim 18, further comprising:
   an arrangement to dock the apparatus on the docking station, wherein the apparatus is to receive Direct Current (DC) power from the docking station.

20. The apparatus of claim 18, wherein the protection cover is to prevent at least in part exposure of the first pad and the second pad to a user.

21. The apparatus of claim 18, wherein the protection cover is to prevent at least in part visibility of the first pad and the second pad to a user.

22. An apparatus comprising:
   first and second battery pads to be in direct contact with first and second supply terminals of a docking station; and
   a protection cover to cover at least in part the first and second battery pads,
   wherein the contact between the first pad and the first terminal, and the contact between the second pad and the second terminal are to be behind the protective cover, and wherein the apparatus lacks an internal battery charger.

23. The apparatus of claim 22, further comprising:
   an arrangement to dock the apparatus on the docking station, wherein the apparatus is to receive Direct Current (DC) power from the docking station.

24. The apparatus of claim 22, wherein the protection cover is to prevent at least in part exposure of the first pad and the second pad to a user.

25. The apparatus of claim 22, wherein the protection cover is to prevent at least in part visibility of the first pad and the second pad to a user.

\* \* \* \* \*